Sept. 1, 1953          K. GEBELE          2,650,526

PHOTOGRAPHIC SHUTTER WITH FLASH SYNCHRONIZER

Filed Sept. 19, 1951          5 Sheets-Sheet 1

FIG.1

INVENTOR
KURT GEBELE,

BY John B. Brady
ATTORNEY

Sept. 1, 1953  K. GEBELE  2,650,526
PHOTOGRAPHIC SHUTTER WITH FLASH SYNCHRONIZER
Filed Sept. 19, 1951  5 Sheets-Sheet 5

INVENTOR
KURT GEBELE,
BY John O. Brady
ATTORNEY:

Patented Sept. 1, 1953

2,650,526

UNITED STATES PATENT OFFICE 2,650,526

PHOTOGRAPHIC SHUTTER WITH FLASH SYNCHRONIZER

Kurt Gebele, Munich, Germany, assignor to Hans Deckel, Munich-Solln, and Friedrich W. Deckel, Post Tutzing, Germany Application September 19, 1951, Serial No. 247,324
In Germany September 20, 1950

18 Claims. (Cl. 95—11.5)

The present invention relates to a photographic shutter with a built-in flash synchronizer member oscillably movable within said shutter and having its own energy source, which synchronizer member is cocked simultaneously when cocking the master member of the shutter, and which after its release releases the master member for the opening and closing of the shutter blades, and with a control cam which is driven by the synchronizer member and which actuates a switch lever for the movable contact member of a flash contact device.

Heretofore the member actuating the movable contact part of the contact device in a synchronizing flash shutter mechanism has frequently been arranged at the flash synchronizer member in such a way that it is in engagement with the contact spring of this device; also when the shutter and the synchronizer are cocked the contact spring is forced only by the stiffness of this contact spring to give way. This arrangement has the disadvantage, however, that upon weakening of the contact spring due to protracted use its stiffness may no longer suffice to sustain the pressure of the actuating member. In such a case the contact spring would be actuated by the member referred to already upon cocking and a flash contact would be made at a time not desired.

One of the objects of the present invention is to avoid this disadvantage and provides a device which is safe and reliable in operation. A further object of the invention is the provision of synchronizer mechanism having the very desirable characteristics above mentioned, and also being of such form that the synchronizer mechanism can be constructed and assembled relatively inexpensively and easily, and also designed so as to require only relatively moderate and inexpensive changes in manufacturing shutters of kinds already in production. These and other desirable objects may be attained in the manner disclosed as illustrative embodiments of the invention in the following description and in the accompanying drawings forming a part hereof, in which:

Figure 1:
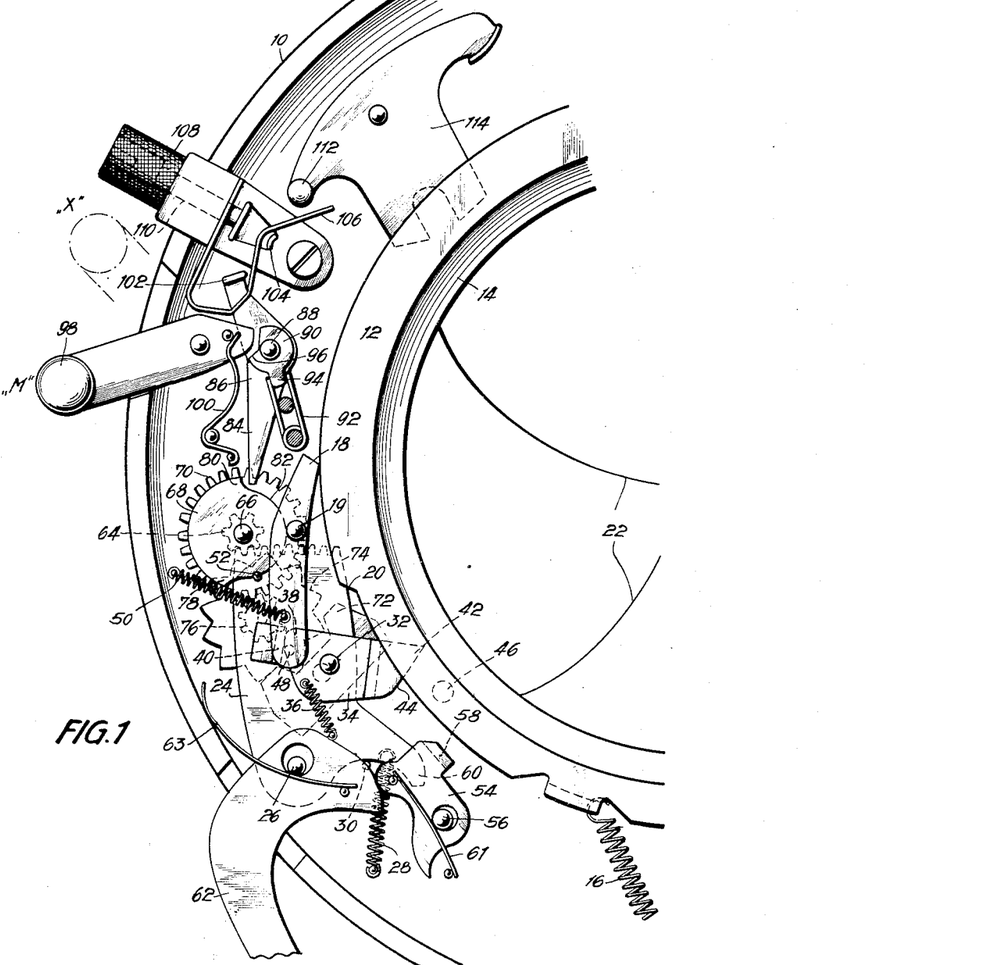
Figure 1 shows the structure of the device according to the invention illustrating the elements of the mechanism when in the inoperative state.
Figure 2:
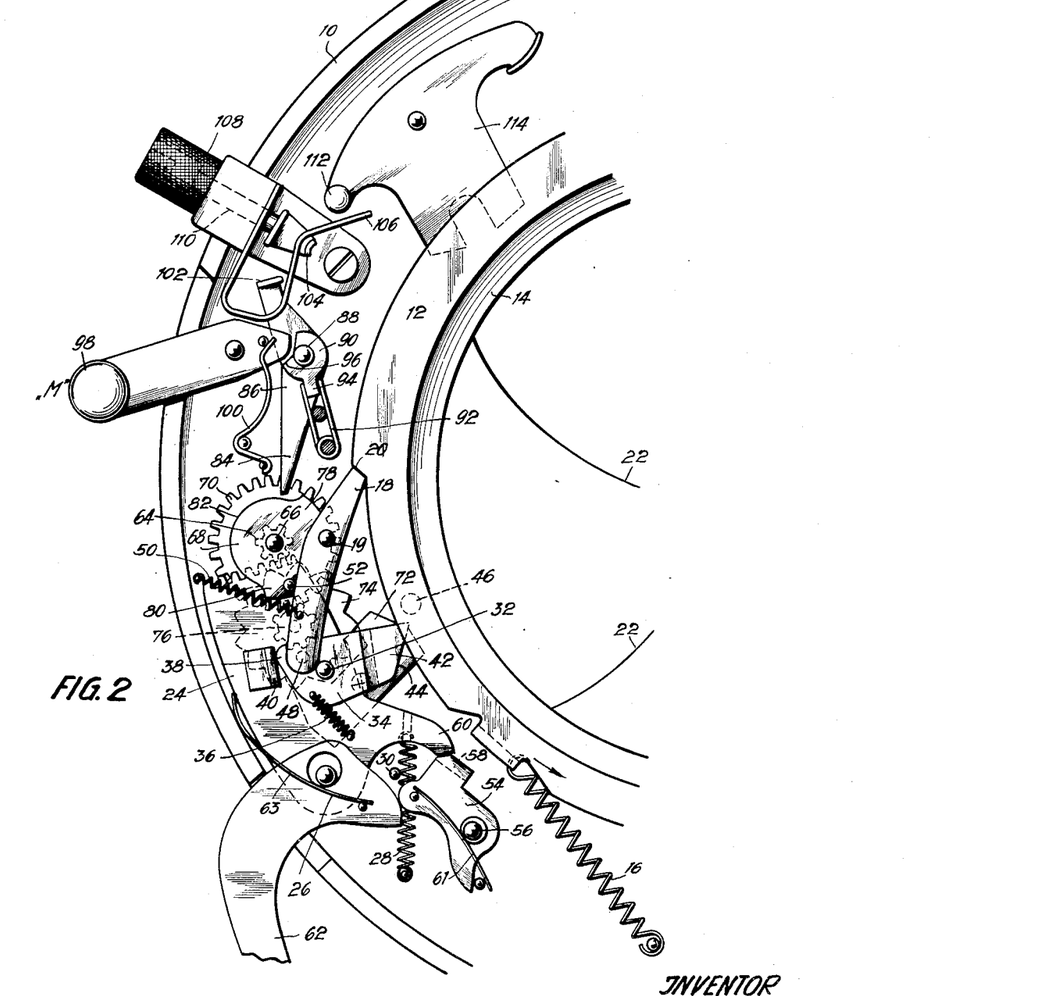
Fig. 2 shows the device in the cocked state.
Figure 3:
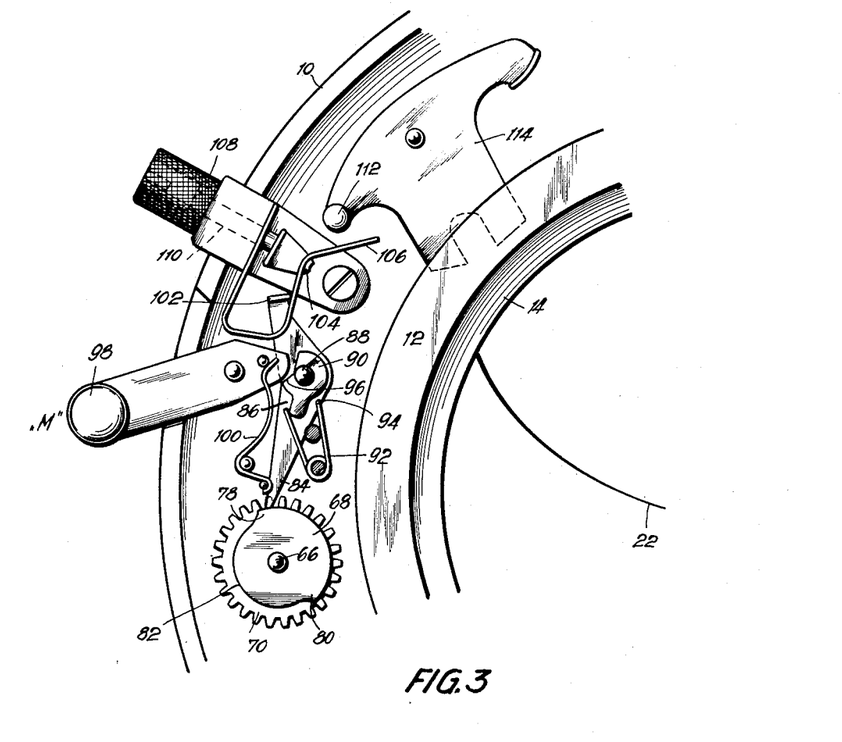
Fig. 3 shows the position of certain of the elements when contact is made.

In the form of the invention according to Figs. 1 to 3, a shutter housing or casing 10 contains a master member, e. g. a tensioning ring 12, mounted in such a way that it can revolve about the lens tube 14. Tensioning ring 12 is maintained under the influence of a spring 16 and can be brought counter to the action thereof from its normal position according to Fig. 1 into the position according to Fig. 2, it being maintained in the cocked or tensioned position by a latching pawl 18, which is mounted at 19 on the plate, not shown, of the shutter and which cooperates with a hook 20 of the tensioning ring 12. Upon the release of the tensioning ring 12 by the pawl 18, the said ring runs down in the direction of the arrow (according to Fig. 2) and effects in a conventional manner the opening and closing of the shutter leaves or blades 22.

The shutter housing 10 contains a toothed segment 24 acting as a synchronizer member, mounted for oscillation about the axis 26 and under the influence of a spring 28 which strives to maintain it applied against an abutment 30 in a clockwise direction. On the synchronizer 24 there is mounted for rotation at 32 an engaging ratchet 34, which is under the influence of a spring 36 which strives to rotate the engaging ratchet 34 in a counterclockwise direction and to pull its nose 38 toward an upwardly bent abutment flap 40 of the synchronizer 24. An additional nose 42 of the engaging ratchet 34 or of its inclined surface 44 protrudes, in the position according to Fig. 1, into the path of a pin 46 at the tensioning ring 12.

The latching pawl 18 is provided with an engaging pin 48, which is located above the engaging ratchet 34 without being in engagement therewith, however; but it may come into engagement with the abutment flap 40 of the synchronizer 24, which protrudes to within the movement zone of this engaging pin 48. The pawl 18 is moreover under the influence of a spring 50, which strives to pull the latter in clockwise direction toward an abutment pin 52, which—like the pawl 18 itself— is located at the plate, not shown, of the shutter.

The shutter casing 10 also contains a latching pawl 54, mounted for rotation about a pin 56, in such a way that it is movable about the synchronizer 24. The pawl 54 presents a downwardly bent lug 58 which protrudes into the movement zone of the synchronizer 24 and which can cooperate with a nose 60 thereof. A weak spring 61 strives to turn the pawl 54 in counterclockwise direction and to push it against a releasing lever 62, which is mounted for rotation about the axis 26 of the synchronizer 24 and is under the action of a spring 63.

The toothing of the synchronizer 24 meshes with a toothed wheel 64 which is mounted for rotation at 66 in the shutter housing 10. Coaxial with the toothed wheel 64 and rigidly connected therewith is a control cam 68 and an additional toothed wheel 70. The movements of the toothed wheel 70 are restrained or delayed by an anchor 72 with anchor wheel or escapement 74 of conventional type and mode of operation, which parts are in drive connection with the toothed wheel 70 across an intermediate wheel 76.

The control cam 68 presents two offset control cams 78 and 80, which are formed at the periphery of the control cam 68 by the termination of a cavity 82. The periphery of the control cam 68 is so shaped that the cavity 82 extends about a peripheral distance which exceeds one-half of the total periphery of the control cam 68. Into the cavity 82 of the cam member 68 there protrudes an arm 84 of a two-arm switch lever 86 in its center position which is mounted for swinging movement at 88 in the shutter housing 10. During a rotational movement of the cam member 68, the arm 84 is turned by the said control cams 78, 80 in one or the other direction, and the switch lever 86 may swing respectively from its center position as will be explained in detail later. A tilting means 90 is secured on the switch lever 86; a spring 92 cooperates with a nose 94 of the tilting means 90 and strives to maintain the tilting means 90 together with the switch lever 86 in the center position shown in Figs. 1 and 2. The tilting means 90 presents a surface 96 which cooperates with a reversing lever 98, in such a way that upon displacing the reversing lever 98 from the position "M" shown in solid lines in Figs. 1 to 3, to the position "X" indicated in chain-dotted lines, the reversing lever 98 presses against the surface 96 and turns the tilting means 90 together with the switch lever 86 counter to the action of the spring 92 in counterclockwise direction, so that the arm 84 of the switch lever 86 is moved out of the zone of the control cam 68. It will also be understood that the reversing lever 98 is maintained in its particular position by a catch spring 100.

The second arm 102 of the two-arm switch 86 actuates a contact device arranged in the shutter housing 10. This contact device consists of two contact members, namely of a stationary contact member 104 and an elastically movable contact member 106. The connection of the contact members 104, 106 to a flash device, not shown, occurs across a contact socket 108 fastened in the shutter housing 10, in such a way that one pole is connected with the contact spring 106 across the mass of the contact socket 108, while the other pole is in current-carrying connection with the contact part 104 across an intermediate member 110 arranged in insulated relation within the contact socket 108. In a certain position (Fig. 3) of the switch lever 86 the contact spring 106 is pushed by the arm 102 against the contact member 104 and the circuit of the flash device is closed.

The contact spring 106, as will be explained in more detail hereinafter, can be actuated also by another part, that is, by the arm 112 of the angle lever 114, of the shutter mechanism itself, and a closed contact made from that end.

The device described operates in the following manner:

When an exposure is to be made with flash light, that is, using a flash bulb whose lighting delay is about 20 ms., the reversing lever 98 must be set in the position "M" and the contact members 104 and 106 connected with the flash device by inserting a plug, not shown, connected to a cable, in the socket 108. Then the shutter must be brought from the inoperative position according to Fig. 1 into the cocked position according to Fig. 2. In Fig. 1, the releasing lever 62 and the pawl 54 are not shown in the inoperative position, but in a position in which the releasing lever 62 is depressed a little by the operator. The cocking or tensioning of the shutter is effected by the displacement of the tensioning ring 12 in the direction of the arrow shown in Fig. 1, its spring 16 being tensioned. During this movement the pin 46 of the tensioning ring 12 impinges on the surface 44 of the engaging ratchet 34; since the engaging ratchet 34 is in engagement with the synchronizer 24 across 38, 40, the synchronizer 24 is turned, during this cocking movement, in a counterclockwise direction under tensioning of its spring 28. Shortly before completion of the cocking operation the pin 46 leaves the ratchet 34, 44, and the synchronizer 24 is maintained in the cocked or tensioned position by the latching pawl 54, whose lug 58 comes to apply against the nose 60, as can be seen from Fig. 2. The tensioning ring 12 is then moved a little further still, namely, until the latching pawl 18 snaps in behind the ratchet of the nose 20 of the tensioning ring 12 and holds it in the cocked position.

During this tensioning movement of the synchronizer 24 and of the shutter master member or tensioning ring 12, the toothed wheels 64, 70 and the cam member 68 are displaced across the toothing of the synchronizer 24 from the position according to Fig. 1 into the position according to Fig. 2. The arm 84 of the switch lever 86 is then turned by the control cam 80 in a counterclockwise direction from its center position, its other arm 102 being moved away from the contact spring 106. The switch lever 86 remains in the turned position until its arm 84 leaves the periphery of the cam member 68 and can enter behind the control cam 78 in the cavity 82 and again occupy its center position Fig. 2. During the cocking operation, therefore, the arm 102, of the switch lever 86 actuating the contact spring 106 has not come into contact with said spring; on the contrary, it has been turned away therefrom. Thereby a possible closing of the circuit is safely avoided during the cocking operation.

After completion of the cocking operation, therefore, the parts again occupy the cocked position shown in Fig. 2, and the device is ready for making an exposure.

The release occurs by actuation of the releasing lever 52 by the operator, this lever being turned in a counterclockwise direction. At this time the latching pawl 54 in engagement with it, is turned in a clockwise direction until its abutment lug 58 releases the nose 60 of the synchronizer 24. Under the influence of its spring 28 the synchronizer 24 then begins to run in a clockwise direction, and in so doing also sets the cam member 68 into rotational movement. The running down of these parts is restrained by the restraining mechanism 72, 74. Immediately after the rotational movement of the cam member 68 has begun, the switch lever 84, 86 is turned in a clockwise direction by the control cam 78, and its arm 102 then presses the contact spring 106 against the contact member 104, whereby a closed circuit of the flash device is produced, Fig. 3.

After a certain distance has been run, the abutment 40 of the synchronizer 24 impinges on the pin 48 of the latching pawl 18 and turns it in a counterclockwise direction, so that the tensioning ring 12 is released and runs down in the direction of the arrow in Fig. 2 under the influence of its spring 16. At this time, an opening and closing of the shutter leaves or blades 22 is effected in a conventional manner. In the open position of the sectors the lighting delay of the flash bulb has elapsed after the contact connection, so that this flash bulb produces a flash and the illumination of the photosensitive base is effected.

As the tensioning ring 12 runs down, its pin 46 impinges on the nose 42 of the engaging ratchet 34, which in the meantime again protrudes into its zone of movement. The engaging ratchet is then turned in a clockwise direction counter to its spring 36, without disturbing the running down of the synchronizer 24, and this condition lasts until the pin 46 releases it. After completion of the exposure and of the run-down movement, the parts again assume the position represented in Fig. 1.

When effecting exposures with a flash bulb presenting no or only a slight lighting delay, the contact connection must not be made until during the opening of the shutter leaves 22. In such a case, therefore, the reversing lever 98 must be brought into the position "X" (Fig. 1). The switch lever 86 is then turned across the tilting means 90, 96, from its center position in counterclockwise direction until its arm 84 leaves the zone of the cam member 68, 78, 80 and its other arm 102 leaves the zone of the contact spring 106. The method of operation of the device is otherwise the same as described above, with the only difference that also the switch lever 84, 86, 102 is inactive and the actuation of the contact spring 106 occurs through an unwinding operation of the shutter mechanism itself, in the present case the arm 112 of the angle lever 114, immediately after the opening of the shutter leaves 22.

Figure 4:
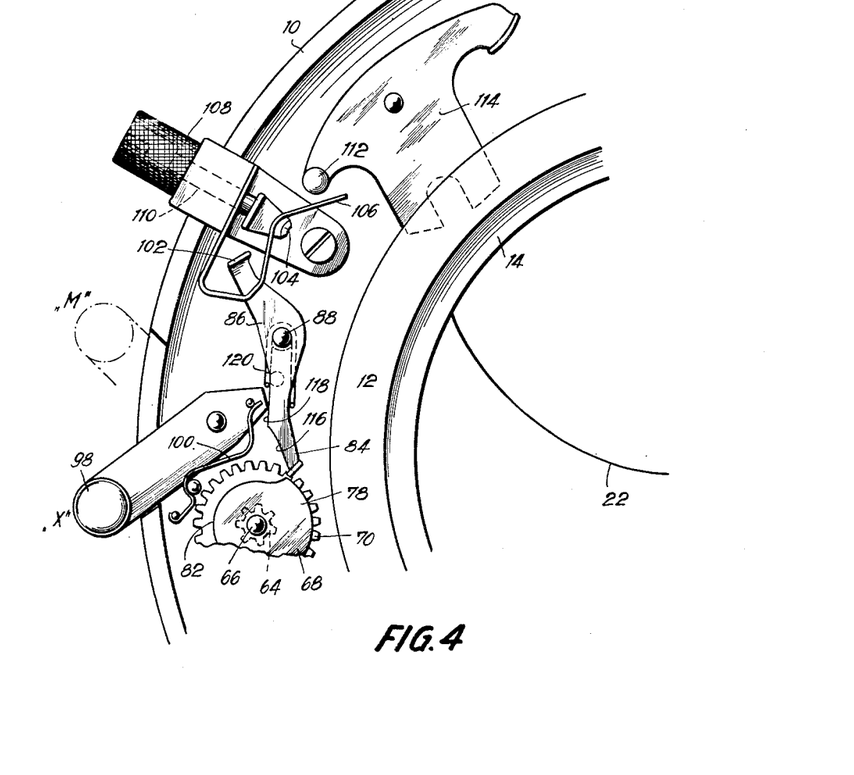
Fig. 4 shows a modified form of the invention, omitting certain of the parts already shown in Figs. 1 to 3.

In Fig. 4 another form of the invention is shown. In principle and effect this device works in the same manner as that according to Figs. 1 to 3, only that here the switch lever 84, 86, 102, is not provided with any special tilting means, but the reversing lever 98 cooperates directly with control surfaces 116, 118 of the switch lever 86, and, depending on the setting, brings it about that the switch lever 86 can assume its center position under the influence of a spring 120 or be turned out of it in a counterclockwise direction. In the position shown in Fig. 4, for example, the reversing lever 98 is set on "X" and the switch lever 86 is inactive.

Figure 5:
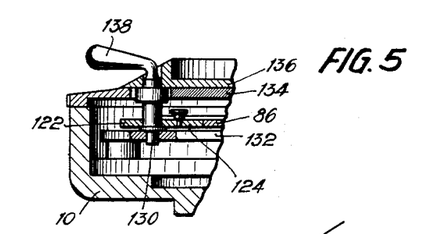
Figs. 5 and 6 shows a further modified form of the invention, likewise with the omission of the parts already shown in Figs. 1 to 3.
Figure 6:
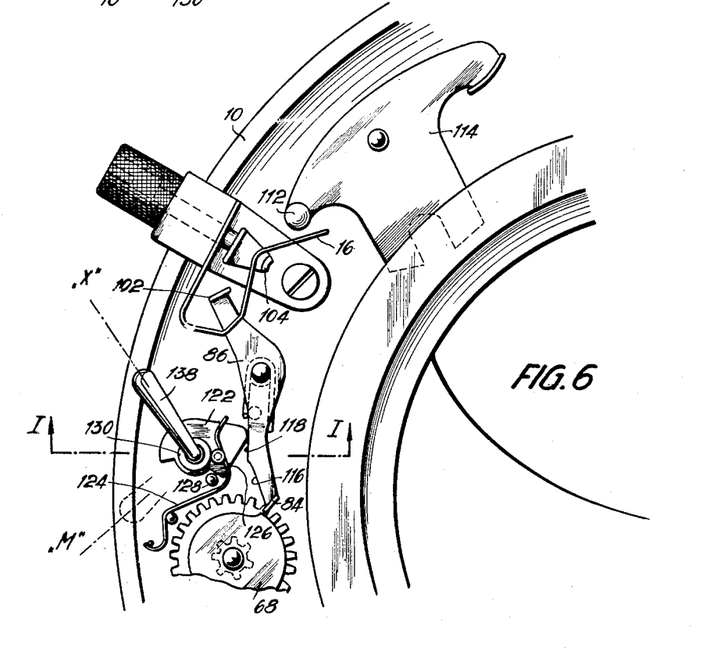

The reversing device according to Figs. 5 and 6 consists of a cam-shaped reversing member 122 which cooperates with the control surfaces 116, 118, of the switch lever 86 for the purpose of turning the latter. The reversing member 122 is secured in position by a catch spring 124 which strives to apply the nose 126 of the reversing member 122 against an abutment pin 128. The reversing member 122 is secured on an axis 130 which is rotatably mounted on the interior of the shutter housing 10, for example, in a plate 132, extending parallel with the optical axis of the shutter. The axis 130 passes through the cover plate 134 and the front plate 136 of the shutter and ends in a handle 138 bent approximately parallel with the shutter front.

In the form of the invention last described, the actuating mechanism is advantageously arranged so as to pivot parallel with the shutter front, and this in such a way that in its end positions it does not extend beyond the shutter periphery. This makes it possible to use this form of the invention with shutters arranged to collapse in the camera.

It will also be understood that in all forms of the invention the reversal from "M" to "X," both in the inoperative state and in the cocked position of the parts, can take place because the control cams 78, 80 and the cavity 82 are arranged on the cam member 68 in such a way that in both operative positions they enable the moving of the arm 84 of the switch lever 86 out of the zone of a cam member 68.

While the invention has been described in certain preferred embodiments it is realized that further modifications may be made and I desire that it be understood that no limitations upon my invention are intended other than may be imposed by the scope of the appended claims.

What I claim as new and desire to secure by Letters Patent of the United States, is as follows:

1. A photographic shutter including a casing, a plurality of shutter blades movable between closed and open positions, a master member movable within said casing between tensioned and run-down positions to cause blade opening and closing movement, a synchronizer member movable oscillably within said casing between tensioned and run-down positions, a source of driving power for said synchronizer member separate from the source of power for said master member, a first releasable latch for holding said master member in tensioned position, a second releasable latch for holding said synchronizer member in tensioned position, means for releasing said second latch so that said synchronizer member may run down, means carried on said synchronizer member for releasing said first latch during the run-down movement of said synchronizer member so that said master member runs down to cause blade opening and closing movement, a flash contact device comprising a fixed contact member and a movable contact member, a switch lever pivotally mounted within said casing to effect a swinging movement from its center position, a control cam coupled with said synchronizer member for oscillable movement, a first arm on said switch lever provided to cooperate with said movable contact member, a second arm on said switch lever provided to cooperate with said control cam, said control cam operating during the tensioning movement of said synchronizer member to cause the second arm of said switch lever to move in one direction from its center position and thus to move the first arm thereof away from the movable contact member, while during the run-down movement of said synchronizer member said control cam causes the second arm of said switch lever to move in another direction from its center position and thus to move the first arm thereof for effecting an engagement of the movable contact member with the fixed contact member.

2. A photographic shutter, as set forth in claim 1, in which said control cam includes a cavity on the periphery thereof for receiving said second arm of said switch lever in its center position.

3. A photographic shutter, as set forth in claim 1, wherein a reversing member is pivotally mounted in said casing, and tilting means connected with said switch lever, said reversing member serving to actuate said tilting means and move said second arm of the switch lever out of the path of movement of said control cam and move said first arm of the switch lever out of the zone of the movable contact member of the flash contact device.

4. A photographic shutter, as set forth in claim 1, wherein a reversing member is pivotally mounted in said casing, and in which said switch lever is provided with tilting surfaces, said reversing member serving to actuate said tilting surfaces and thus move said second arm of the switch lever out of the path of movement of said control cam and move said first arm of the switch lever out of the zone of the movable contact member of the flash contact device.

5. A photographic shutter, as set forth in claim 1, wherein a reversing member is pivotally mounted in said casing, and tilting means connected with said switch lever, said reversing member serving to actuate said tilting means and move said second arm of the switch lever out of the path of movement of said control cam and move said first arm of the switch lever out of the zone of the movable contact member of the flash contact device, and wherein said tilting means is secured on the switch lever and is in engagement with a spring which strives to maintain the tilting means and thus the switch lever in their center position.

6. A photographic shutter, as set forth in claim 1, in which said control cam includes a cavity on the periphery thereof for receiving said second arm of said switch lever in its center position and wherein said cavity surpasses one-half of the periphery of said control cam and permits the out-of-movement of said second arm of the switch lever, both in the tensioned and run-down position of said synchronizer member.

7. A photographic shutter, as set forth in claim 1, wherein a reversing member is pivotally mounted in said casing, and in which said switch lever is provided with tilting surfaces, said reversing member serving to actuate said tilting surfaces and thus move said second arm of the switch lever out of the path of movement of said control cam and move said first arm of the switch lever out of the zone of the movable contact member of the flash contact device, and wherein said control cam includes a cavity on the periphery thereof for receiving said second arm of said switch lever in its center position and in which said cavity surpasses one-half of the periphery of said control cam and permits the out-of-movement of said second arm of the switch lever both in the tensioned and run-down position of said synchronizer member.

8. A photographic shutter, as set forth in claim 1, wherein a reversing member is pivotally mounted in said casing, and in which said switch lever is provided with tilting surfaces, said reversing member serving to actuate said tilting surfaces and thus move said second arm of the switch lever out of the path of movement of said control cam and move said first arm of the switch lever out of the zone of the movable contact member of the flash contact device, and spring means which strives to maintain the switch lever in its center position.

9. A photographic shutter, as set forth in claim 1, wherein a reversing member is pivotally mounted in said casing, and tilting means connected with said switch lever, said reversing member serving to actuate said tilting means and move said second arm of the switch lever out of the path of movement of said control cam and move said first arm of the switch lever out of the zone of the movable contact member of the flash contact device, in which said control cam includes a cavity on the periphery thereof for receiving said second arm of said switch lever in its center position and wherein said cavity surpasses one-half of the periphery of said control cam and permits the out-of-movement of said second arm of the switch lever, both in the tensioned and run-down position of said synchronizer member, and wherein the reversing member is secured in position by a catch spring.

10. A photographic shutter, as set forth in claim 1, wherein a reversing member is pivotally mounted in said casing, and in which said switch lever is provided with tilting surfaces, said reversing member serving to actuate said tilting surfaces and thus move said second arm of the switch lever out of the path of movement of said control cam and move said first arm of the switch lever out of the zone of the movable contact member of the flash contact device, and wherein said control cam includes a cavity on the periphery thereof for receiving said second arm of said switch lever in its center position and in which said cavity surpasses one-half of the periphery of said control cam and permits the out-of-movement of said second arm of the switch lever both in the tensioned and run-down position of said synchronizer member, and wherein the reversing member is secured in position by a catch spring.

11. A photographic shutter, as set forth in claim 1, wherein a reversing member is pivotally mounted in said casing, and tilting means connected with said switch lever, said reversing member serving to actuate said tilting means and move said second arm of the switch lever out of the path of movement of said control cam and move said first arm of the switch lever out of the zone of the movable contact member of the flash contact device, in which said control cam includes a cavity on the periphery thereof for receiving said second arm of said switch lever in its center position and wherein said cavity surpasses one-half of the periphery of said control cam and permits the out-of-movement of said second arm of the switch lever, both in the tensioned and run-down position of said synchronizer member, and in which said reversing member projects through a slot on the periphery of said casing and is accessible from the periphery of said casing.

12. A photographic shutter, as set forth in claim 1, wherein a reversing member is pivotally mounted in said casing, and in which said switch lever is provided with tilting surfaces, said reversing member serving to actuate said tilting surfaces and thus move said second arm of the switch lever out of the path of movement of said control cam and move said first arm of the switch lever out of the zone of the movable contact member of the flash contact device, and wherein said control cam includes a cavity on the periphery thereof for receiving said second arm of said switch lever in its center position and in which said cavity surpasses one-half of the periphery of said control cam and permits the out-of-movement of said second arm of the switch lever both in the tensioned and run-down position of said synchronizer member, and wherein an operating member is connected with said reversing member, said operating member projecting through the front part of said casing and being accessible from the front of said casing.

13. A photographic shutter, as set forth in claim 1, wherein a reversing member is pivotally mounted in said casing, and tilting means connected with said switch lever, said reversing member serving to actuate said tilting means and move said second arm of the switch lever out of the path of movement of said control cam and move said first arm of the switch lever out of the zone of the movable contact member of the flash contact device, in which said control cam includes a cavity on the periphery thereof for receiving said second arm of said switch lever in its center position and wherein said cavity surpasses one-half of the periphery of said control cam and permits the out-of-movement of said second arm of the switch lever, both in the tensioned and run-down position of said synchronizer member, and in which said reversing member projects through a slot on the periphery of said casing and is accessible from the periphery of said casing, and in which said operating member is pivotably parallel to the front of said casing and in its end positions does not extend beyond the periphery of said casing.

14. A photographic shutter, as set forth in claim 1, which also includes an engaging ratchet pivotally mounted on and movable with said synchronizer member, said ratchet having two noses thereon, a pin arranged on and movable with said master member, an abutment on said synchronizer member, a spring means acting upon said engaging ratchet to move one nose of said ratchet against said abutment and the other nose in the path of said pin on the master member, whereby during the tensioning movement of said master member the pin thereof engages said other nose of said ratchet to move said synchronizer member in its tensioned position against the action of its driving power.

15. A photographic shutter, as set forth in claim 1, which also includes an engaging ratchet pivotally mounted on and movable with said synchronizer member, said ratchet having two noses thereon, a pin arranged on and movable with said master member, an abutment on said synchronizer member, a spring means acting upon said engaging ratchet to move one nose of said ratchet against said abutment and the other nose in the path of said pin on the master member, whereby during the tensioning movement of said master member the pin thereof engages said other nose of said ratchet to move said synchronizer member in its tensioned position against the action of its driving power, in which said first latch for holding said master member in its tensioned position is formed as a latching pawl pivotally mounted in said casing, a spring means acting upon said latching pawl to move it in the latching position, an abutment arranged on and movable with said synchronizer member, and a pin arranged on and movable with said latching pawl and lying in the path of movement of said abutment on the synchronizer member, whereby near the end of the run-down movement of said synchronizer member its abutment engages and moves said pin on the latching pawl to effect a releasing movement thereof.

16. A photographic shutter, as set forth in claim 1, which also includes an engaging ratchet pivotally mounted on and movable with said synchronizer member, said ratchet having two noses thereon, a pin arranged on and movable with said master member, an abutment on said synchronizer member, a spring means acting upon said engaging ratchet to move one nose of said ratchet against said abutment and the other nose in the path of said pin on the master member, whereby during the tensioning movement of said master member the pin thereof engages said other nose of said ratchet to move said synchronizer member in its tensioned position against the action of its driving power, in which said first latch for holding said master member in its tensioned position is formed as a latching pawl pivotally mounted in said casing, a spring means acting upon said latching pawl to move it in the latching position, an abutment arranged on and movable with said synchronizer member, and a pin arranged on and movable with said latching pawl and lying in the path of movement of said abutment on the synchronizer member, whereby near the end of the run-down movement of said synchronizer member its abutment engages and moves said pin on the latching pawl to effect a releasing movement thereof, and in which said second latch for holding said synchronizer member in its tensioned position is formed as a latching pawl releasable by means of a manually operated releasing lever.

17. A photographic shutter, as set forth in claim 1, which also includes an engaging ratchet pivotally mounted on and movable with said synchronizer member, said ratchet having two noses thereon, a pin arranged on and movable with said master member, an abutment on said synchronizer member, a spring means acting upon said engaging ratchet to move one nose of said ratchet against said abutment and the other nose in the path of said pin on the master member, whereby during the tensioning movement of said master member the pin thereof engages said other nose of said ratchet to move said synchronizer member in its tensioned position against the action of its driving power, in which said first latch for holding said master member in its tensioned position is formed as a latching pawl pivotally mounted in said casing, a spring means acting upon said latching pawl to move it in the latching position, an abutment arranged on and movable with said synchronizer member, a pin arranged on and movable with said latching pawl and lying in the path of movement of said abutment on the synchronizer member, whereby near the end of the run-down movement of said synchronizer member its abutment engages and moves said pin on the latching pawl to effect a releasing movement thereof, in which said second latch for holding said synchronizer member in its tensioned position is formed as a latching pawl releasable by means of a manually operated releasing lever, and in which the manually operated releasing lever and the synchronizer member are movably mounted on a common bearing pin of said casing.

18. A photographic shutter, as set forth in claim 1, which also includes a first-toothed wheel arranged on and movable with said control cam coupled with said synchronizer member, a second-toothed wheel pivotally mounted within said casing and engaging said first-toothed wheel, an escapement arranged on and movable with said second-toothed wheel, and an anchor pivotally mounted in said casing and engaging said escapement, the run-down movement of said control cam and said synchronizer member being delayed by said anchor and said escapement.

KURT GEBELE.

References Cited in the file of this patent

UNITED STATES PATENTS

| Number | Name | Date |
|---|---|---|
| 2,365,847 | Steiner | Dec. 26, 1944 |
| 2,541,895 | Thunberg | Feb. 13, 1951 |